United States Patent
Konopa

(10) Patent No.: US 7,210,302 B2
(45) Date of Patent: May 1, 2007

(54) REFRIGERATOR WITH REGULABLE DEHUMIDIFICATION

(75) Inventor: Helmut Konopa, Leipheim (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 163 days.

(21) Appl. No.: 10/640,231

(22) Filed: Aug. 13, 2003

(65) Prior Publication Data
US 2004/0074243 A1   Apr. 22, 2004

Related U.S. Application Data

(63) Continuation of application No. PCT/EP02/13806, filed on Dec. 5, 2002.

(30) Foreign Application Priority Data
Dec. 13, 2001 (DE) ............... 101 61 306

(51) Int. Cl.
F25D 21/06 (2006.01)
F25D 21/00 (2006.01)
(52) U.S. Cl. ............... 62/154; 62/158; 62/272
(58) Field of Classification Search ........... 62/154, 62/272, 155, 157, 158, 139, 140, 274
See application file for complete search history.

(56) References Cited

U.S. PATENT DOCUMENTS 2,549,547 A * 4/1951 Trask .................. 62/176.6
2,900,806 A * 8/1959 Wurtz et al. ............. 62/186
5,819,552 A * 10/1998 Lee ....................... 62/407

FOREIGN PATENT DOCUMENTS

| EP | 54172 A2 | * | 6/1982 |
|---|---|---|---|
| FR | 2 474 668 | | 7/1981 |
| JP | 60144549 A | | 7/1985 |
| JP | 04208381 A | * | 7/1992 |
| JP | 05010652 A | * | 1/1993 |
| JP | 05256550 A | * | 10/1993 |
| JP | 10332239 A | * | 12/1998 |
| JP | 2000028257 A | | 1/2000 |
| JP | 2000088422 A | * | 3/2000 |
| JP | 2000088432 A | | 3/2000 |
| JP | 2001272147 A | | 10/2001 |

* cited by examiner

Primary Examiner—Chen-Wen Jiang
(74) Attorney, Agent, or Firm—Russell W. Warnock; Craig J. Loest

(57) ABSTRACT

A no-frost refrigerator includes at least one storage compartment, an evaporator, which can be switched on and off and is disposed in a chamber that is separate from the storage compartment, and a fan for driving an exchange of air between the storage compartment and the chamber. Of the evaporator and fan, at least one can be operated while the other is switched off.

7 Claims, 2 Drawing Sheets

REFRIGERATOR WITH REGULABLE DEHUMIDIFICATION

CROSS-REFERENCE TO RELATED APPLICATION

This application is a continuation of copending International Application No. PCT/EP02/13806, filed Dec. 5, 2002, which designated the United States and was not published in English.

BACKGROUND OF THE INVENTION

Field of the Invention

The present invention relates to a no-frost refrigerator. In the case of such refrigerators, an evaporator is disposed, for example, in a chamber that is separated from a storage compartment for articles that are to be cooled, and an exchange of air between the chamber and the storage compartment, by which the latter is cooled, takes place in that, with the aid of a fan on the evaporator, cooled and dried air is blown into the storage compartment and relatively warm, humid air is taken out of the storage compartment into the chamber. In such a case, the storage compartment is not just cooled, but also dehumidified. The moisture condenses on the evaporator. This dehumidification prevents refrigeration where, under critical climatic conditions, particularly if the refrigerator is used in warm surroundings with a high level of air humidity, condensation condenses on set-down surfaces and articles that are to be cooled in the storage compartment. However, in the case of less critical ambient conditions, this advantage may turn into a disadvantage if stored foodstuffs are dried out by the intensive dehumidification.

Also known are so-called hybrid refrigerators in which the evaporator is in direct thermal contact with the storage compartment and a fan is used to produce an air flow in the storage compartment that passes over an evaporator-cooled side wall of the storage compartment and, thus, intensifies the exchange of heat between the storage compartment and evaporator. In the case of these hybrid appliances, the dehumidifying action is less intensive than in the case of a no-frost appliance because moisture that has condensed on the cooled wall of the storage compartment, over non-operational periods of the evaporator, has the opportunity of evaporating back into the storage compartment. This also means, however, that, under critical use conditions, the risk of the undesired formation of condensation is higher in the case of such appliances than in the case of a no-frost appliance.

SUMMARY OF THE INVENTION

It is accordingly an object of the invention to provide a refrigerator with regulable dehumidification that overcomes the hereinafore-mentioned disadvantages of the heretofore-known devices of this general type and that is capable, under diverse climatic conditions, of achieving a favorable compromise between the risk of the formation of condensation in the storage compartment and the risk of drying out the articles that are to be cooled.

With the foregoing and other objects in view, there is provided, in accordance with the invention, a no-frost refrigerator, including at least one storage compartment, heat insulation, an evaporator disposed separate from the at least one storage compartment with the heat insulation, and a fan for driving an exchange of air between the storage compartment and the evaporator, at least one of the evaporator and the fan being operated while the other one of the evaporator and the fan is switched off.

Operating the fan when the evaporator has been switched off assists the moisture condensed on the evaporator from being evaporated back into the storage compartment, and, thus, combats the drying out of articles that are to be cooled.

For moisture to be evaporated back, it is most effective if the fan is operated toward the end of a switched-off phase of the evaporator, when the latter is in the defrosting phase, at a point in time where the evaporator is relatively warm and moisture condensed thereon evaporates more readily than at the beginning of a switched-off phase, where the moisture is, generally, completely frozen on the evaporator.

With respect to the efficiency of the refrigerator, it is desirable for the fan also to be operated at the beginning of a switched-off phase of the evaporator, to, thus, utilize a temperature gradient that still exists at the time between the storage compartment and the evaporator for cooling the storage compartment.

A particularly straightforward solution here is to operate the fan continuously when the evaporator has been switched off.

In accordance with another feature of the invention, there is provided a control circuit connected to the evaporator and the fan for controlling operation of the evaporator and the fan, the circuit operating the fan continuously when the evaporator has been switched off.

In accordance with a further feature of the invention, the evaporator is operated when the fan has been switched off.

In accordance with an added feature of the invention, the control circuit regulates operation of the evaporator when the fan has been switched off to keep a temperature of the evaporator at least one of below a temperature of the storage compartment and below 0° C.

In accordance with an additional feature of the invention, the control circuit regulates operation of the evaporator when the fan has been switched off to keep a temperature of the evaporator at least one of below a temperature of the storage compartment and below 0° C.

Furthermore, it is desirable to also operate the evaporator when the fan has been switched off. It is, thus, possible, between two "normal" cooling phases of the refrigerator, in which the evaporator and fan are operated together, for the temperature of the evaporator always to be kept below the temperature of the storage compartment, preferably, below 0° C., to, thus, limit the evaporation from the evaporator back into the storage compartment to an unavoidable minimum.

In the case of a straightforward configuration of the invention, the refrigerator has an operating-mode selector switch by which a control circuit that controls the operation of the evaporator and of the fan can be switched over between at least two of the following operating states:

a) operation of the evaporator when the fan has been switched on and, at least temporarily, when it has been switched off;

b) simultaneous operation of the evaporator and of the fan; and c) operation of the fan when the evaporator has been switched on and, at least temporarily, when it has been switched off.

This makes it possible for the user, by changing over the operation-mode selector switch from operating state a) to b) or from b) to c), to combat the undesired formation of condensation in the storage compartment or, by changing over from operating state c) to b) or from b) to a), to limit undesired drying out of the articles that are to be cooled.

Alternatively, or as a supplement, the refrigerator may also be equipped with a humidity sensor, the control circuit automatically switching over between at least two of the operating states a), b), and c) in dependence on a measured value of the humidity sensor.

Such a humidity sensor is, preferably, disposed on the storage compartment; however, it is also conceivable for the sensor to be fitted outside the storage compartment so that the humidity sensor can sense the humidity of the ambient air (and, thus, the amount of moisture introduced into the storage compartment each time the door is opened).

In accordance with yet another feature of the invention, in the operating state a), the control circuit, in each switched-off phase of the fan, keeps the evaporator temporarily switched off and temporarily switched on.

In accordance with yet a further feature of the invention, in the operating state a), the control circuit, in each switched-off phase of the fan, periodically switches the evaporator on and off.

In accordance with yet an added feature of the invention, in the operating state c), the control circuit operates the fan continuously in each switched-off phase of the evaporator.

In accordance with yet an additional feature of the invention, the evaporator is disposed in the storage compartment and is encapsulated by the heat insulation.

In accordance with again another feature of the invention, there is provided an evaporator compartment disposed separately from the storage compartment with the heat insulation, the evaporator being disposed in the evaporator compartment.

With the objects of the invention in view, there is also provided a no-frost refrigerator, including at least one storage compartment defining an interior, heat insulation, an evaporator disposed in an area separate from the interior of the at least one storage compartment with the heat insulation, and a fan for driving an exchange of air between the interior of the storage compartment and the area of the evaporator, at least one of the evaporator and the fan being operated while the other one of the evaporator and the fan is switched off.

Other features that are considered as characteristic for the invention are set forth in the appended claims.

Although the invention is illustrated and described herein as embodied in a refrigerator with regulable dehumidification, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
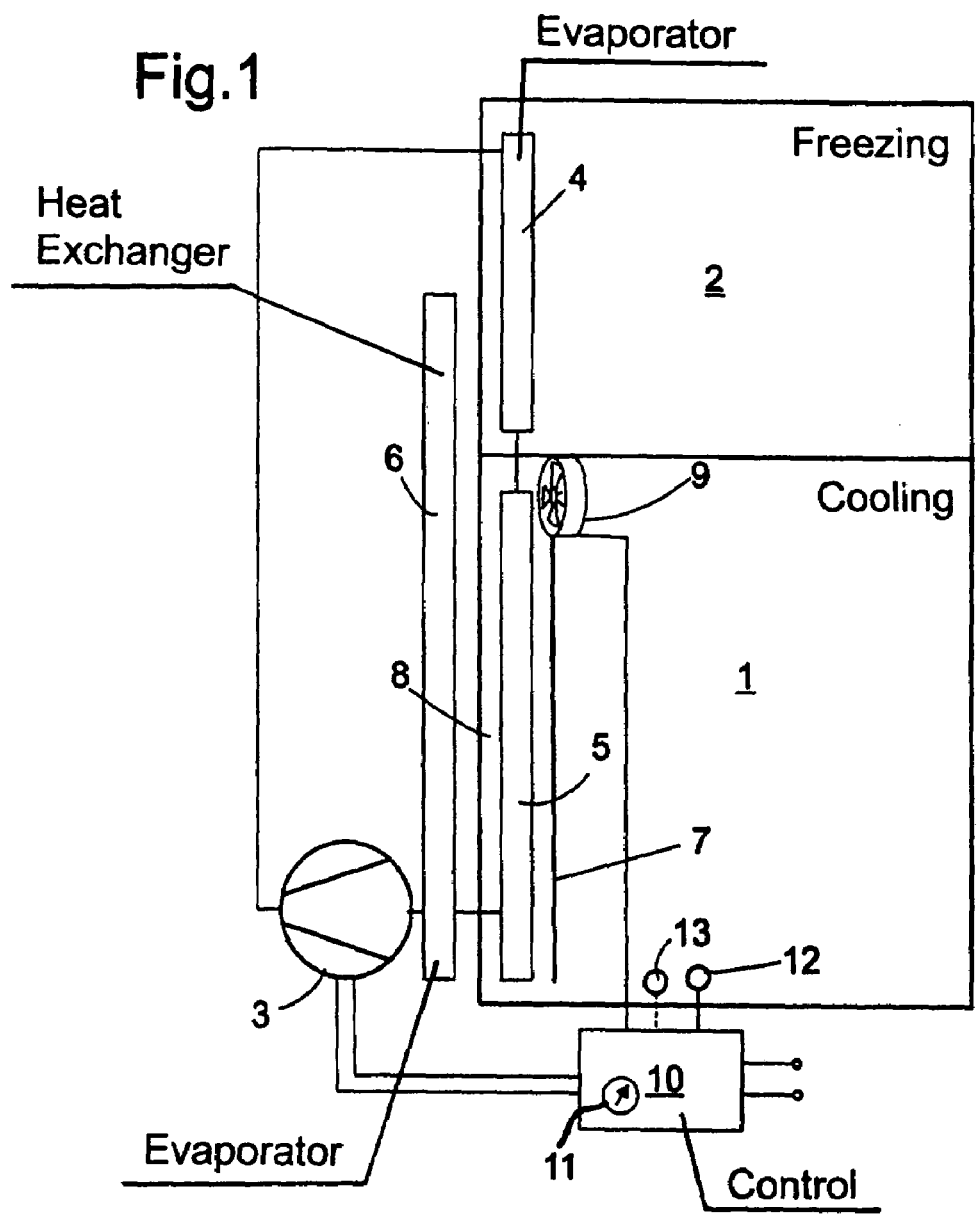
FIG. 1 is a block circuit diagram of a no-frost refrigerator according to the invention.

Referring now to the figures of the drawings in detail and first, particularly to FIG. 1 thereof, there is shown a refrigerator that is configured with combined refrigerating and freezing functions and in which the present invention is realized. A cooling compartment 1 and a freezing compartment 2 form two temperature zones of the refrigerator. A refrigerant circuit includes a compressor 3, which pumps a compressed refrigerant successively through two evaporators 4, 5 of the freezing compartment 2 and of the cooling compartment 1, respectively, and a heat exchanger 6, through which the refrigerant, which is expanded in the evaporators 4, 5, runs before entering into the compressor 3, again. In the present case, the evaporator 5, which is associated with the cooling compartment 1 and is configured as a lamellar evaporator, is accommodated in a chamber 8, which is separated off from the cooling compartment 1 by a thermally insulating wall 7. The chamber 8 communicates with the cooling compartment 1 through air-inlet and air-outlet openings, a fan 9 that is intended for driving the exchange of air between the chamber 8 and the cooling compartment 1 being disposed in one of these openings.

A control circuit 10 is connected to a temperature sensor 12, which is disposed in the cooling compartment, and to the compressor 3 and the fan 9 through control lines and is capable of switching the compressor 3 and the fan 9—and, directly through the compressor 3, the evaporators 4, 5—on and off in dependence on a temperature sensed by the temperature sensor 12. The control circuit 10 has three operating states a), b), and c), and a user can select one of these operating states by actuating a selector switch 11.

Figure 3:
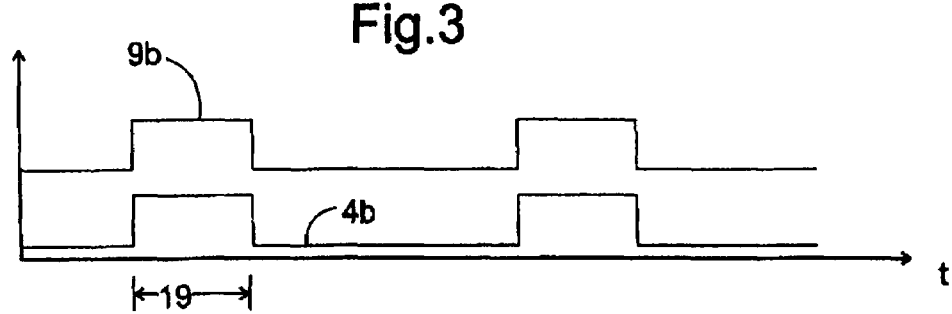
FIG. 3 is a timing diagram for the operation of the evaporator and fan of FIG. 1 in accordance with a second operating state of the invention.

The normal operating state b) corresponds to the conventional operation of a no-frost refrigerator; a timing diagram for this operating state is shown in FIG. 3. If the temperature measured by the temperature sensor 12 in the cooling compartment 1 exceeds a first limit value, the control circuit 10 switches on the evaporator 4 and the fan 9 substantially simultaneously, this being illustrated in each case by high levels of the curves 4b and 9b respectively illustrating the operating states of the evaporator 4 and the fan 9. If, once a period of a few minutes has elapsed, the temperature in the cooling compartment 1 drops below a second limit value that is lower than the first, then the control circuit 10 switches the evaporator 4 and fan 9 off again, this being illustrated as low levels of the curves 4b, 9b. During the operating periods of the fan 9, the evaporator 4, with the possible exception of a short period as it begins to operate, is cooled, and moisture that is carried out by air coming from the cooling compartment 1 condenses on the evaporator 4. In the switched-off phases of the evaporator 4, the moisture frozen on the evaporator can thaw and flow away and is removed from the refrigerator.

Figure 2:
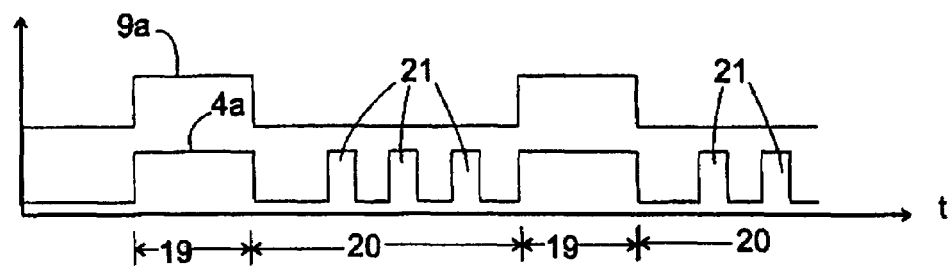
FIG. 2 is a timing diagram for the operation of the evaporator and fan of FIG. 1 in accordance with a first operating state of the invention.

If a user establishes that an undesirably large amount of moisture is, nevertheless, condensing in the cooling compartment 1, then he/she can switch over the selector switch 1 to the operating state a), of which the timing diagram is illustrated in FIG. 2 by operating-state curves 4a and 9a of the respective evaporator 5 and fan 9. In operating state a), the phases 19 of simultaneous operation of the evaporator and fan are substantially no different from those of the operating state b); their start and end are each defined with reference to the measuring result of the temperature sensor 12. However, while the fan remains switched off between two such simultaneous operating phases 19 of the evaporator and fan, the switched-off or non-operational phase 20 of the evaporator 5 is interrupted in each case by short operating phases 21. The duration of the short operating phases 21 is such that the evaporator 5 is reliably kept at a lower temperature than the cooling compartment 1, preferably, below 0° C., and, thus, moisture frozen on the evaporator 4 is prevented from evaporating back into the cooling compartment 1.

The position in time and the duration of the short operating phases 21 may be regulated, in a manner analogous to the operating phases 19, by a temperature sensor that is connected to the control circuit 10, but, nevertheless, is disposed on the evaporator 5; alternatively, however, it is also possible for the control circuit 10 to produce the short operating phases 21 in a fixedly predetermined time pattern. In such a case, the time interval between the end of one operating phase 19 and the first short operating phase 21 that follows is greater than the interval between the short operating phases 21, because it is assumed that, at the end of each operating phase 19, the evaporator 5 is at a temperature that is considerably lower than freezing and, in the first instance, requires some amount of time to heat up to the extent where a short operating phase 21 is necessary, the temperature of the chamber 8 that is to be maintained by the short operating phases 21 being closer to 0° C. than the temperature that is reached at the end of the operating phase 19.

If the low temperature of the evaporator 5 is maintained over a large number of cycles each including the operating phase 19 and switched-off phase 20, an increasingly thick layer of ice forms over time on the evaporator 5, this layer of ice being detrimental to the effectiveness of the evaporator. To prevent such formation of ice, the evaporator may be equipped with an electric heating device that makes it possible, within a single switched-off phase 20 that is not interrupted by operating phases 21, to thaw the layer of ice and allow it to flow away. Instead of such a heating device, however, it is also possible for provision to be made for the control device 10, in the operating state a), from time to time, not to introduce switched-off phases that are interrupted by the short operating phases 21 and give the evaporator 5 the opportunity of defrosting.

Figure 4:
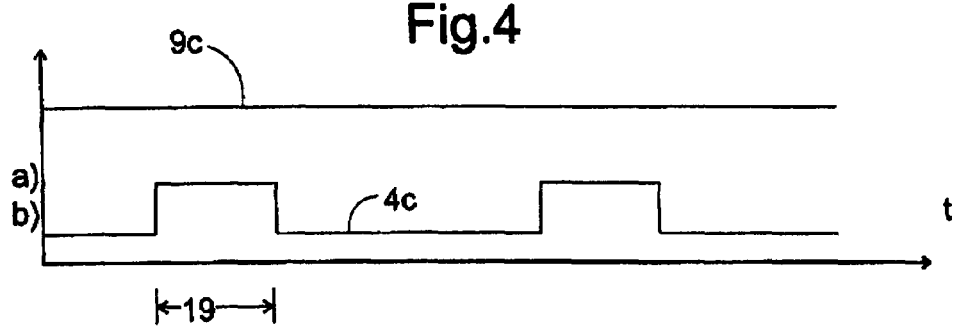
FIG. 4 is a timing diagram for the operation of the evaporator and fan of FIG. 1 in accordance with a third operating state of the invention.

If, in contrast, a user of the refrigerator establishes that articles that are to be cooled in the cooling compartment 1 are drying out undesirably quickly, then he/she can use the selector switch 11 to set an operating state c), for which a timing diagram for the operation of the evaporator 5 and fan 9 is illustrated in FIG. 4. While the operating phases and switched-off phases of the evaporator 5, illustrated by a curve 4c, alternate in a controlled manner with one another, as in the curves 4a and 4b for operating states a) and b), respectively, in dependence on the result of the temperature sensor 12, the fan 9 in operating state c) operates continuously, as is illustrated by the straight line 9c. This means that, even when the evaporator 5 has been switched off, relatively warm air is taken out of the cooling compartment 1 into the chamber 8, where it heats the evaporator 5 and causes ice that has been deposited thereon to thaw. The moisture in the evaporator 5 evaporates rapidly as a result of the forced air circulation produced by the fan 9, and is, thus, carried out into the cooling compartment 1.

In the case of a further-developed configuration of the refrigerator according to the invention, the cooling compartment 1 contains a humidity sensor 13 that supplies measured humidity values to the control circuit 10. In such a configuration, the selector switch 11 can be used to set a desired degree of humidity of the cooling compartment 1, the control circuit 10 selecting an operating mode that is suitable for achieving a degree of humidity desired by the user. The control circuit 10, here, selects the operating mode a) if the degree of humidity measured by the humidity sensor 13 is considerably higher than that set by the selector switch 11, and it selects the operating mode c) if the measured humidity value is considerably lower than that which has been set. If the values roughly coincide, use may be made of the operating mode b).

The operating modes illustrated in FIGS. 2 to 4, of course, only constitute an expedient selection of a large number of possible operating modes. It is, thus, possible, for example, in the normal operating mode, for the fan 9 to be switched on and off in each case with a certain time delay in relation to the evaporator 5, with the result that, when the fan 9 is brought into operation, the evaporator 5 has already been cooled and, once the evaporator 4 has been switched off, the fan 9 continues running for a period of time, in order to make use of the residual cold from the former. It is also possible to provide intermediate operating states in each case between the states a) and b) and between b) and c), and so, in one case, the number of short operating phases 21 over the duration of the switched-off phase 20 is smaller than is illustrated in FIG. 2 and defrosting of the evaporator 5 is not fully ruled out and, in the other case, the operation of the fan 9 can be interrupted for a more or less long period of time during a switched-off phase of the evaporator.

I claim:

1. A no-frost refrigerator, comprising:
   at least one storage compartment;
   heat insulation;
   an evaporator disposed separate from said at least one storage compartment with said heat insulation; and
   a fan for driving an exchange of air between said storage compartment and said evaporator, at least one of said evaporator and said fan being operable while the other of said evaporator and said fan is switched off;
   a control circuit connected to said evaporator and said fan for controlling operation of said evaporator and said fan, said circuit regulating operation of said evaporator when said fan has been switched off to keep a temperature of said evaporator at least one of below a temperature of said storage compartment and below 0° C.; and
   said control circuit having an operating-mode selector switch switching over said control circuit between at least two operating states selected from the group consisting of:
   a) operation of said evaporator when said fan has been switched on and, at least temporarily, when said fan has been switched off;
   b) simultaneous operation of said evaporator and said fan; and
   c) operation of said fan when said evaporator has been switched on and, at least temporarily, when said evaporator has been switched off.

2. The no-frost refrigerator according to claim 1, further comprising a humidity sensor connected to said control circuit for measuring a humidity value, said humidity sensor switching over said control circuit, in dependence on said measured value, between said at least two operating states.

3. The no-frost refrigerator according to claim 2, wherein said humidity sensor is disposed on said storage compartment.

4. The no-frost refrigerator according to claim 1, wherein, in said operating state a), said control circuit, in each switched-off phase of said fan, keeps said evaporator temporarily switched off and temporarily switched on.

5. The no-frost refrigerator according to claim 1, wherein, in said operating state a), said control circuit, in each switched-off phase of said fan, periodically switches said evaporator on and off.

6. The no-frost refrigerator according to claim 1, wherein, in said operating state c), said control circuit operates said fan continuously in each switched-off phase of said evaporator.

7. A no-frost refrigerator, comprising:
at least one storage compartment;
heat insulation;
an evaporator disposed separate from said at least one storage compartment with said heat insulation;
a fan for driving an exchange of air between said storage compartment and said evaporator, said fan being operable while said fan is switched off; and
a control circuit connected to said evaporator and said fan for controlling operation of said evaporator and said fan, said control circuit for regulating operation of said evaporator when said fan has been switched off to keep a temperature of said evaporators at least one of below a temperature of said storage compartment and below 0° C.

* * * * *